(12) United States Patent
Peterson et al.

(10) Patent No.: US 7,477,646 B1
(45) Date of Patent: Jan. 13, 2009

(54) ARRANGEMENT FOR CONTROLLING CONGESTION FOR MULTIPLE HOST GROUPS SHARING A SINGLE SIGNALING POINT CODE IN AN IP-BASED NETWORK USING RESPECTIVE GROUP CONGESTION LEVELS

(75) Inventors: Larry Earl Peterson, Apex, NC (US); Vincent L. Deters, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 916 days.

(21) Appl. No.: 10/628,427

(22) Filed: Jul. 29, 2003

(51) Int. Cl.
*H04L 12/28* (2006.01)
(52) U.S. Cl. .................. 370/401; 370/235; 370/252
(58) Field of Classification Search .............. 370/235, 370/236, 251, 401, 410, 465, 467
See application file for complete search history.

(56) References Cited

U.S. PATENT DOCUMENTS

| | | | | |
|---|---|---|---|---|
| 6,747,955 | B1* | 6/2004 | Archer ....................... | 370/236 |
| 6,920,144 | B2* | 7/2005 | Niermann .................... | 370/401 |
| 6,987,781 | B1* | 1/2006 | Miller et al. ............... | 370/456 |
| 7,035,218 | B2* | 4/2006 | Yi ............................ | 370/236 |
| 7,068,654 | B1* | 6/2006 | Joseph et al. ............... | 370/392 |
| 7,088,677 | B1* | 8/2006 | Burst, Jr. .................... | 370/229 |
| 7,136,477 | B2* | 11/2006 | Craig et al. ................. | 379/230 |
| 2002/0075900 | A1* | 6/2002 | Turina et al. ............... | 370/467 |
| 2002/0131427 | A1* | 9/2002 | Niermann .................... | 370/401 |
| 2002/0172209 | A1* | 11/2002 | Ohta et al. .................. | 370/401 |
| 2003/0031178 | A1* | 2/2003 | Haeri et al. ................. | 370/392 |
| 2003/0108067 | A1* | 6/2003 | Craig et al. ................. | 370/522 |
| 2003/0231653 | A1* | 12/2003 | Sprague et al. ............. | 370/467 |
| 2004/0008734 | A1* | 1/2004 | Gilchrist et al. ............ | 370/522 |
| 2004/0141514 | A1* | 7/2004 | Delaney et al. ............. | 370/410 |
| 2006/0078008 | A1* | 4/2006 | Bordonaro et al. .......... | 370/522 |

OTHER PUBLICATIONS

Sidebottom et al., "Signaling System 7 (SS7) Messsage Transfer Part 3 (MTP3)—User Adaptation Layer (M3UA)", IETF Network Working Group, Request for Comments: 3332, Sep. 2002.
Loughney et al., "Signalling Connection Control Part User Adaptation Layer (SUA)", IETF Network Working Group, Internet-Draft, draft-ietf-sigtran-sua-14.txt, Jun. 30, 2002.
Ong et al., "Framework Architecture for Signaling Transport", IETF Network Working Group, Request for Comments: 2719, Oct. 1999.

\* cited by examiner

*Primary Examiner*—Ricky Ngo
*Assistant Examiner*—Kan Yuen
(74) *Attorney, Agent, or Firm*—Leon R. Turkevich (57) ABSTRACT

A Voice over IP network, having multiple application server processes (ASPs) and at least one signaling gateway, communicates with switched circuit network nodes using a prescribed point code. The ASPs are arranged into ASP groups, each ASP group identifying the ASPs configured for processing prescribed message signaling unit (MSU) types. The signaling gateway determines a congestion level for each ASP group. Upon receiving an SS7 message specifying the prescribed point code as the destination point code and carrying a MSU, the signaling gateway selects one of the ASP groups based on identifying a matching MSU type. If the signaling gateway determines that the priority of the MSU is less than the determined congestion level for the ASP group, the signaling gateway drops the MSU and sends back a Transfer Controlled message to the originating signaling node.

24 Claims, 6 Drawing Sheets

| Traffic Configuration | Determine AS Cong. Level By: |
|---|---|
| Override (72a) | Use Highest Cong. Level among Active ASPs (74a) |
| Loadshare (72b) | Use Lowest Cong. Level among Active ASPs (74b) |
| Broadcast (72c) | Use Lowest Cong. Level among Active ASPs (74b) |
| Loadshare Bindings (72d) | Use Highest Cong. Level among Active ASPs (74a) |

ARRANGEMENT FOR CONTROLLING CONGESTION FOR MULTIPLE HOST GROUPS SHARING A SINGLE SIGNALING POINT CODE IN AN IP-BASED NETWORK USING RESPECTIVE GROUP CONGESTION LEVELS

BACKGROUND OF THE INVENTION

1. Field of the Invention

The present invention relates to Voice Over IP telephony; more particularly, the present invention relates to transport of common channel SS7 signaling messages (e.g., Message Transfer Part 3 (MTP3)) by a signaling gateway, received from a circuit switched network node having a prescribed point code, to a call agent according to a prescribed Voice Over IP telephony protocol such as MTP3 User Adaptation Layer (M3UA) or SCCP User Adaptation (UA) Layer (SUA).

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

As recognized in the art, the hardware and software operations of the SS7 protocol are divided into "layers", similar to the Open Systems Interconnect (OSI) Network Model specified by the International Standards Organization (ISO). The "lowest levels" of the SS7 protocol include the Message Transfer Part (MTP) Level 1, Level 2, and Level 3. MTP Level 1 and Level 2 are equivalent to the OSI Physical Layer and the OSI Data Link layer, respectively. MTP Level 3, equivalent to the OSI Network Layer, provides message routing between signaling points in the SS7 network, and re-routes traffic away from failed links and signaling points and controls traffic when congestion occurs.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

One type of signal unit, known as a Message Signal Unit (MSU), includes a routing label which allows an originating signaling point to send information to a destination signaling point across the network. The routing label includes an originating point code (OPC) specifying the originating signaling node, a destination point code (DPC) specifying the destination for the SS7 messaging packet, and a signaling link selection (SLS) field. Hence, the selection of outgoing link is based on information in the DPC and SLS.

The size of the point code may vary depending on protocol; for example, each North American point code according to the American National Standards Institute (ANSI) uses 24 bits, whereas each point code specified by the International Telecommunication Union (ITU) uses 14 bits. In particular, an ANSI point code specifies a network hierarchy based on network, cluster, and member octets (e.g., 245-16-0 decimal). ITU-T point codes are pure binary numbers which may be stated in terms of zone, area/network, and signaling point identification numbers. For example, the point code 5557 (decimal) may be stated as 2-182-5 (binary 010 10110110 101).

The Internet Engineering Task Force (IETF) Signaling Transport (Sigtran) Working Group has been addressing the transport of packet-based PSTN signaling over IP Networks, including evaluation of functional and performance requirements of the PSTN signaling. For example, IP networks need to transport signaling messages such as Q.931 or SS7 ISUP messages, received from the PSTN, between IP nodes such as a Signaling Gateway and Media Gateway Controller or IP-resident databases.

Three published proposals for transport of signaling messages include the Request for Comments (RFC) 2719 by Ong et al., "Framework Architecture for Signaling Transport", December 1999, available on the World Wide Web at the address http://www.ietf.org/rfc/rfc2719.txt and RFC 3332 by Sidebottom et al., "Signaling System 7 (SS7) Message Transfer Part 3 (MTP3)—User Adaptation Layer (M3UA)", September 2002, available on the World Wide Web at the address http://www.ietf.org/rfc/rfc3332.txt, and the IETF Draft by Loughney et al., "Signalling Connection Control Part User Adaptation Layer (SUA)", Jun. 30, 2002, available on the World Wide Web at the address http://www.ietf.org/internet-drafts/draft-ietf-sigtran-sua-14.txt, all three disclosures of which are incorporated in their entirety herein by reference.

RFC 2719 specifies a Voice over IP architecture, including interactions between signaling gateways (SGs), media gateways (MGs) and media gateway controllers (MGCs). In particular, media gateways terminate media streams carried by bearer channels of Switched Circuit Networks (SCN). Media gateways also packetize media data, if necessary, and deliver packetized data to the IP network. MGCs, also referred to as call agents, manage the resources of the MGs by executing application server processes (ASPs): according to RFC 2719, the MGC serves as a possible termination and origination point for SCN application protocols, such as SS7 ISDN User Part (ISUP) and Q.931/DSS1. An SG, also referred to as an IP Transfer Point (ITP), is a signaling agent that receives/sends SCN native signaling at the edge of the IP network. The SG function may relay, translate or terminate SS7 signaling in an SS7-Internet Gateway. The SG function also may be co-resident with the MG function to process SCN signaling associated with line or trunk terminations controlled by the MG (e.g., signaling backhaul).

RFC 3332 specifies the Stream Control Transmission Protocol (SCTP) as a transport protocol for transporting SCN-based signaling messages (e.g., SS7) over IP. In particular, the SCTP provides a mechanism for transporting SS7 MTP3-User Part messages (e.g., ISUP, Signalling Connection Control Part (SCCP), Telephone User Part (TUP), etc.) between an SG and an MGC. Hence, an SG implementing SCTP will terminate SS7 MTP2 and MTP3 protocol layers, and deliver ISUP, SCCP and/or any other MTP3-User protocol messages, as well as certain MTP network management events, over SCTP transport associations to MTP3-User peers in MGCs or IP-resident databases.

The Internet Draft by Loughney et al. specifies SUA as a protocol for the transport of any Signalling Connection Control Part-User signalling (e.g., Transaction Capabilities Protocol, Radio Access Network Application Protocol, etc.) over IP using the Stream Control Transmission Protocol.

Figure 1:
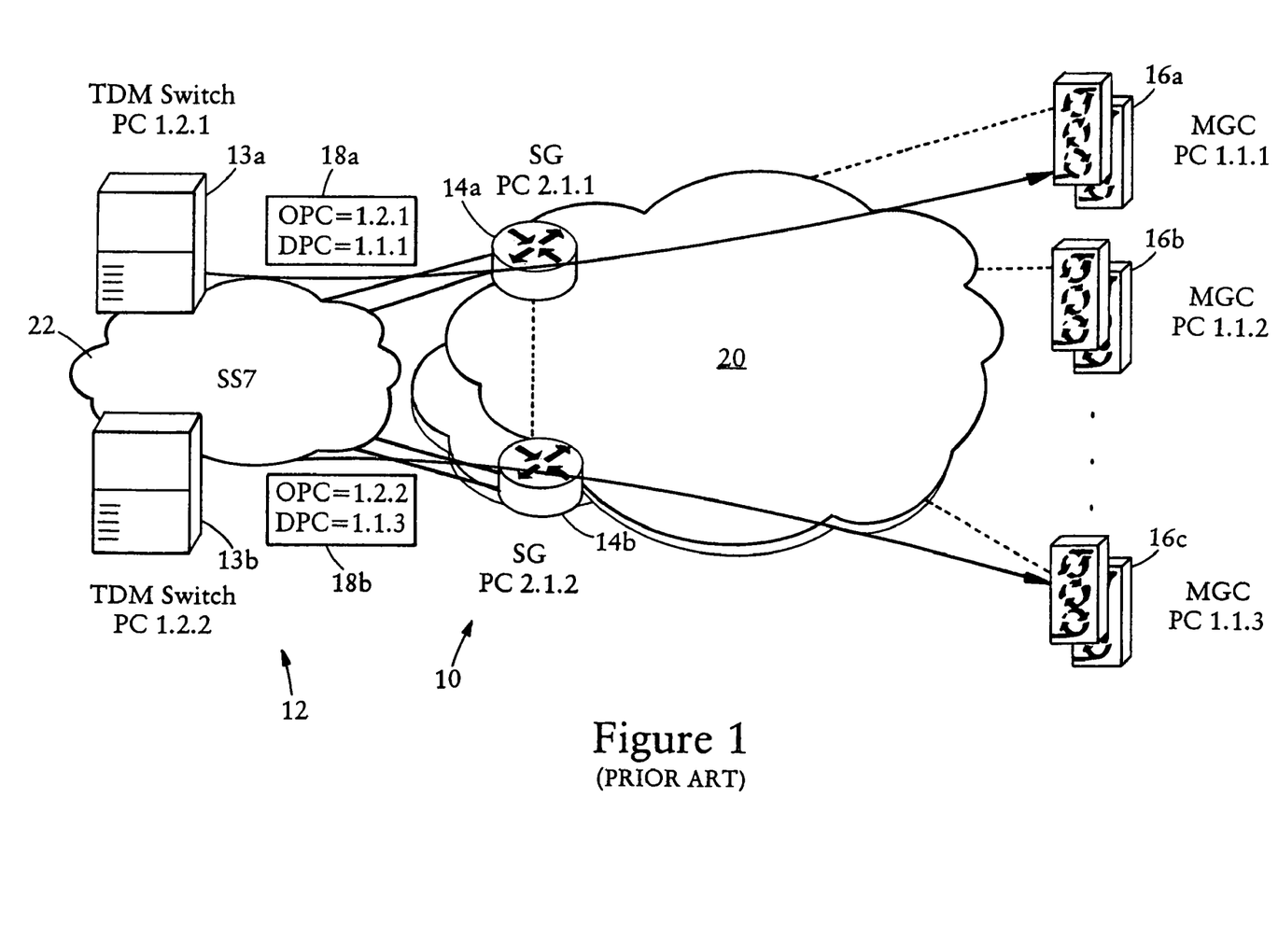
FIG. 1 is a diagram illustrating a prior known (PRIOR ART) architecture for transporting SS7 signaling messages to nodes in an IP network.

FIG. 1 is a block diagram illustrating an exemplary Voice over IP telephony network 10, deployed according to RFC 2719, RFC 3332, and SUA protocol, for communications with a TDM-based circuit switched public telephony system 12. The telephony system 12 includes TDM switches 13a and 13b having point codes 1.2.1 and 1.2.2 respectively. The TDM switches 13a and 13b may be substituted with mated pairs of signaling transfer points (STPs). The IP-based telephony network 10 includes signaling gateways (SGs) 14a and 14b having point codes 2.1.1 and 2.1.2, respectively. The Voice over IP network 10 also includes MGCs 16a, 16b, and 16c having point codes 1.1.1, 1.1.2, and 1.1.3, respectively, and an IP network 20 for transfer of signaling information between the MGCs and the SGs. Each signaling gateway (e.g., 14a, 14b) is configured for routing a signaling application protocol message (e.g., ISUP, SCCP) carried by a signaling message (e.g., 18a, 18b), from the circuit switched SS7 network 22 to a destination MGC (e.g., 16a, 16c) based on the corresponding destination point code (e.g., DPC=1.1.1, DPC=1.1.3).

Figure 2:
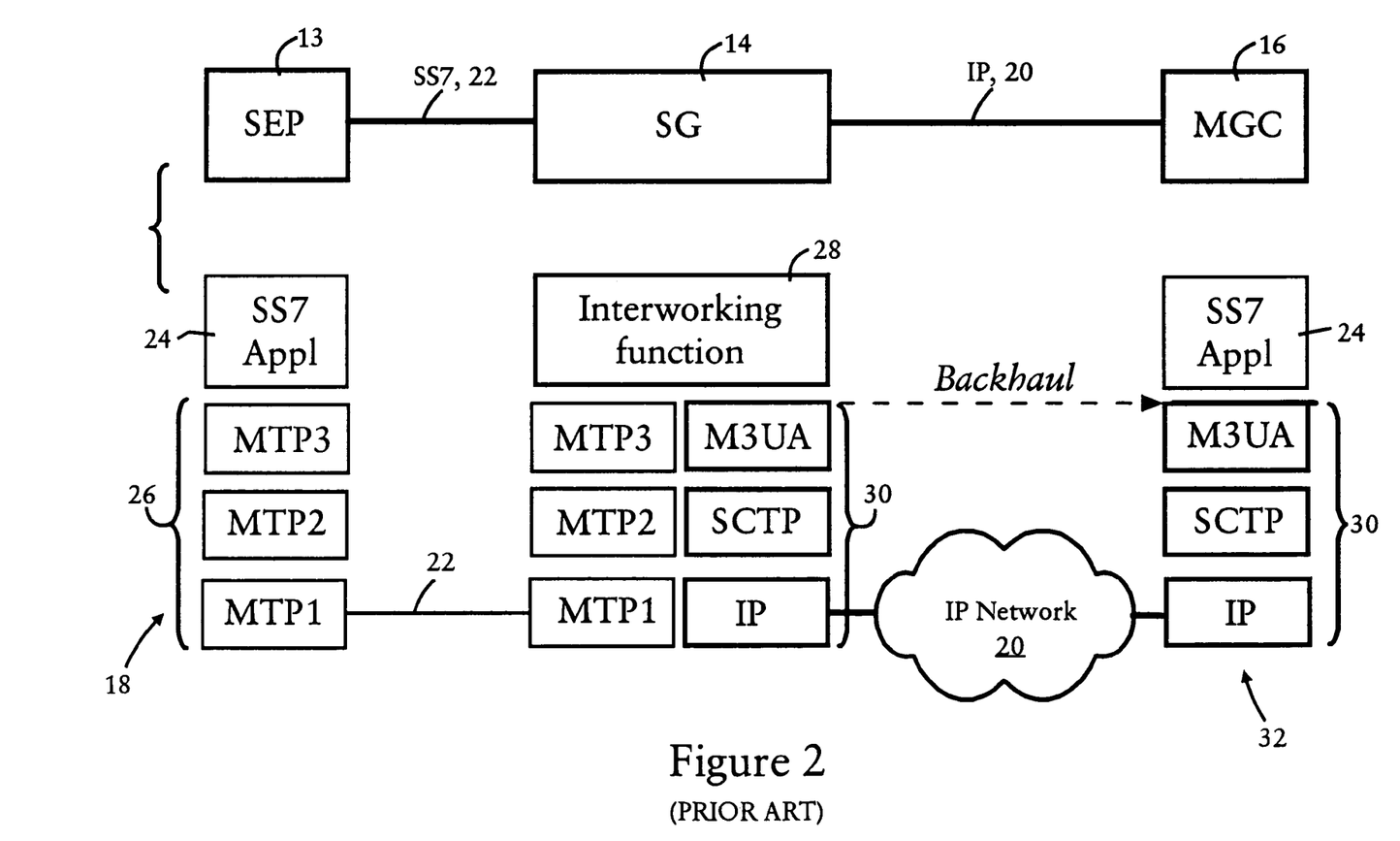
FIG. 2 is a (PRIOR ART) diagram illustrating interworking between an circuit switched (e.g., SS7) signaling node, a signaling gateway, and an IP node according to a known protocols.

FIG. 2 is a diagram illustrating in further detail the user adaptation architecture according to the Sigtran working group, including RFC 2719 and RFC 3332. Each SS7 signaling message 18 output by a signaling endpoint (SEP) 13 (e.g., a TDM switch or STP) includes a signaling application protocol message 24 (e.g., ISUP/SCCP, TCAP/MAP, TUP, etc.) and an MTP layer 26. The SG 14 includes an interworking resource 28 configured for removing the MTP layer, generating an M3UA header 30, and outputting via the IP network 20 an M3UA protocol message 32 having the M3UA header 30 and the user part message 24. The M3UA message 32 is output to the MGC (e.g., 16a) provisioned with the point code corresponding to the destination point code of the SS7 signaling message.

Concerns arise in adding additional Voice over IP-based nodes to accommodate increased traffic and call processing demands within the Voice over IP telephony network. In particular, as the capacity of media gateway controllers (i.e., call agents) supplied by vendors increases (e.g., call processing capacity, number of gateways supported, etc.) existing network engineers may wish to add additional call agent host controllers to enable the deployed network to meet increased traffic and call processing demands. However, building call agent clusters currently requires a dedicated originating point code (OPC) for each call agent pair, making the node appear as multiple switching entities.

Further, current congestion mechanisms in SS7 networks perform congestion notification on a point code (PC) basis through the use of the Transfer Controlled (TFC) message. As described above, SS7 over IP adaption layers such as M3UA and SUA enable many IP nodes (ASPs) to connect to an SS7 signalling gateway (SG), use the MTP and SCCP services and layers of the SG, and share a common point code. In these configurations, the SG must consider the congestion levels of all ASPs sharing a specific PC before a TFC can be sent for PC congestion notification. Existing approaches use a collective congestion level for the shared PC. Hence, when a MSU is received at an SG, the SG checks for congestion of the destination PC in the MSU. If the destination PC is congested, a TFC is returned to the node that sent the original MSU. The node that receives the TFC will stop sending MSUs for a period of time or until it receives an indication that the PC is no longer congested.

Sending a TFC based on collective PC congestion level could cause unnecessary traffic cessation for uncongested ASPs or ASPs that are congested at lower levels.

SUMMARY OF THE INVENTION

There is a need for an arrangement that enables a Voice over IP network, having multiple signaling gateways and call agents (i.e., media gateway controllers), to be deployed as representing a single signaling node using a single point code while minimizing interruption of MSU traffic from an SS7 node to an IP node within the Voice over IP network.

There also is a need for an arrangement that enables multiple signaling message transfer nodes (e.g., call agents, signaling gateways) to share a single point code between each other in a Voice over IP network.

There also is a need for an arrangement that enables deployment of a scalable Voice over IP network that can be easily provisioned based on use of a prescribed point code, and that provides a means for controlling congestion for an identified IP node within the Voice over IP node, without otherwise affecting signaling traffic destined to other IP nodes within the Voice over IP network.

These and other needs are attained by the present invention, where a network, having multiple application server processes (ASPs) and at least one signaling gateway, communicates with switched circuit network nodes using a prescribed point code. The ASPs are arranged into ASP groups, each ASP group identifying the ASPs configured for processing prescribed message signaling unit (MSU) types. The signaling gateway determines a congestion level for each ASP group. Upon receiving an SS7 message specifying the prescribed point code as the destination point code and carrying a MSU, the signaling gateway selects one of the ASP groups based on identifying a matching MSU type. If the signaling gateway determines that the priority of the MSU is less than the determined congestion level for the ASP group, the signaling gateway drops the MSU and sends back a Transfer Controlled message to the originating signaling node. Hence, congestion is managed based on ASP groups, instead of on a point-code basis, eliminating unnecessary congestion management mechanisms for signaling messages destined for otherwise uncongested ASP groups.

One aspect of the present invention provides a method in a signaling gateway in a network. The method includes determining a congestion level for each of a plurality of application server process groups. Each application server process group has at least one assigned application server process configured for providing services for a corresponding message signaling unit attribute; hence, each application server process is assigned to one of the application server process groups. The signaling gateway has a prescribed point code. The method also includes receiving an SS7 message having an originating point code specifying an originating node and a destination point code specifying the prescribed point code, the SS7 message carrying a message signaling unit having specified attributes. The method also includes identifying one of the application server process groups as a candidate group for processing the message signaling unit based on a determined match between the corresponding message signaling unit attribute and at least a corresponding portion of the specified attributes. A congestion notification message is selectively sent to the originating node based on determining that an identified priority of the message signaling unit does not exceed the corresponding congestion level for the candidate group.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 3:
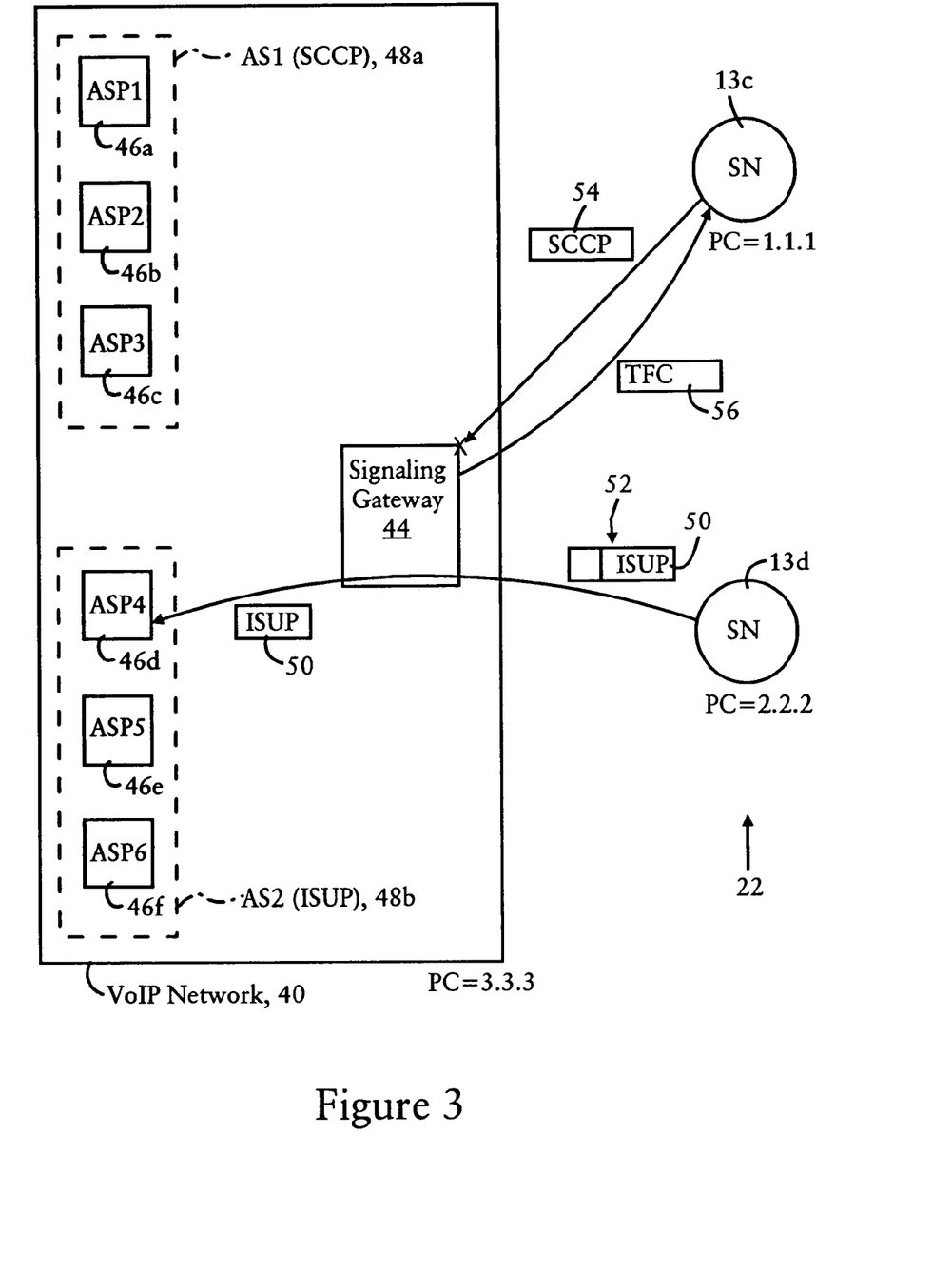
FIG. 3 is a diagram illustrating a Voice over IP network utilizing a signaling gateway configured for distributing signaling messages between switched circuit signaling nodes and IP-based call agents, according to an embodiment of the present invention.

FIG. 3 is a block diagram illustrating a Voice over IP network 40 configured for interfacing with an SS7 signaling network 22, according to an embodiment of the present invention. As illustrated in FIG. 3, the signaling network 22 includes SSP-capable PSTN switches 13c and 13d having respective point codes 1.1.1, and 2.2.2. Although not shown in FIG. 3, the SS7 signaling network 22 could include a mated pair of switching transfer points (STPs) for routing signaling traffic.

The Voice over IP network 40 includes signaling message transfer nodes, for example signaling gateways and call agents, sharing the same point code 3.3.3. For simplicity, a single signaling gateway 44 is illustrated, although typically the Voice over IP network 40 will include multiple signaling gateways 44 that communicated with mated STPs. The signaling gateway 44 is also referred to as an IP Transfer Point (ITP).

The Voice over IP network 40 also includes call agents (i.e., media gateway controllers) that execute application server processes (ASPs) 46 (e.g., 46a, 46b, 46c, 46d, 46e, and 46f), and media gateways (not shown). The media gateways are configured for establishing media connections with the PSTN switches 13c and 13d via trunk lines (not shown), and are controlled by the ASPs 46.

Each call agent 46 is configured for communication with the signaling gateway 44 via the IP network 20, in compliance with the above-incorporated proposals by the IETF Sigtran Working Group, including RFC 2719, RFC 3332, and the IETF Draft by Loughney et al. on SUA. In particular, each of the ASPs 46 is assigned an Application Server (AS) identity, for example AS1 48a or AS2 48b. Hence, each Application Server 48a and 48b is defined as having at least one assigned ASP, and each ASP 46 is preferably assigned to one and only one AS 48.

As described below, the signaling gateway 44 includes a routing key table having routing keys, where each routing key specifies prescribed signaling parameter values that enable the signaling gateway 44 to map a received signaling message 52 to an AS 48. Hence, the signaling gateway 44 identifies an ASP 46 for processing a MSU 50 from a received signaling message 52 based on identifying a matching routing key entry for an AS 48 that specifies routing key parameters (i.e., message signaling unit attributes) that match specified parameters (i.e., attributes) of the received signaling message 52; once the signaling gateway 44 has identified the matching routing key entry for the matching AS 48, the signaling gateway 44 identifies an active ASP 46 assigned to the matching AS 48 that is to receive the MSU within the received signaling message 52.

However, concerns arise regarding an arbitrary implementation of a voice over IP network utilizing a single point code that may result in a particularly inefficient implementation. In particular, concerns arise that congestion is represented in the SS7 network on a point code basis, and that congestion messages may unnecessarily reduce signaling traffic. In particular, assume in FIG. 3 that the AS1 48a is configured for processing SCCP messages, and that the AS2 48b is configured for processing ISUP messages. Also assume that the signaling node 13c is sending a substantial number of SCCP signaling messages 54 to the voice over IP network 40 that are causing congestion in the AS1 48a, whereas the signaling node 13d is sending ISUP messages 52 at a lower rate that does not cause congestion in the AS2 48b.

Hence, instances may arise where a single AS (e.g., 48a) may be congested due to a substantial amount of SCCP messages 54 being sent by the signaling node 13c. Conventional congestion control on a point code basis would cause the signaling gateway 44 to normally send a transfer controlled (TFC) message to the signaling node 13d in response to the ISUP signaling message 52 based on the detected aggregated congestion condition for the point code "3.3.3", even though the AS 48b is not congested and is still capable of processing ISUP signaling messages.

According to the disclosed embodiment, the signaling gateway 44 determines a congestion level for each of the ASs 48 (i.e., ASP groups). Hence, in response to receiving a signaling message 52 or 54 specifying an OPC, a DPC matching the provisioned point code assigned the signaling gateway (e.g., 3.3.3) and a signaling application protocol message 24 (e.g., ISUP, SCCP, TUP, etc.), the signaling gateway 44 first identifies one of the ASP groups 48 as a candidate group based on a determined match between parameters in the received signaling message 52 or 54 and the corresponding matching routing key entry. The signaling gateway 44 then compares the congestion level for the candidate ASP group (e.g., 48a) with the specified priority in the received signaling message; if the specified priority does not exceed the congestion level for the candidate ASP group, the signaling gateway 44 drops the received signaling message and sends a congestion notification message (e.g., TFC) 56 to the originating signaling node (e.g., 13c).

Figure 4:
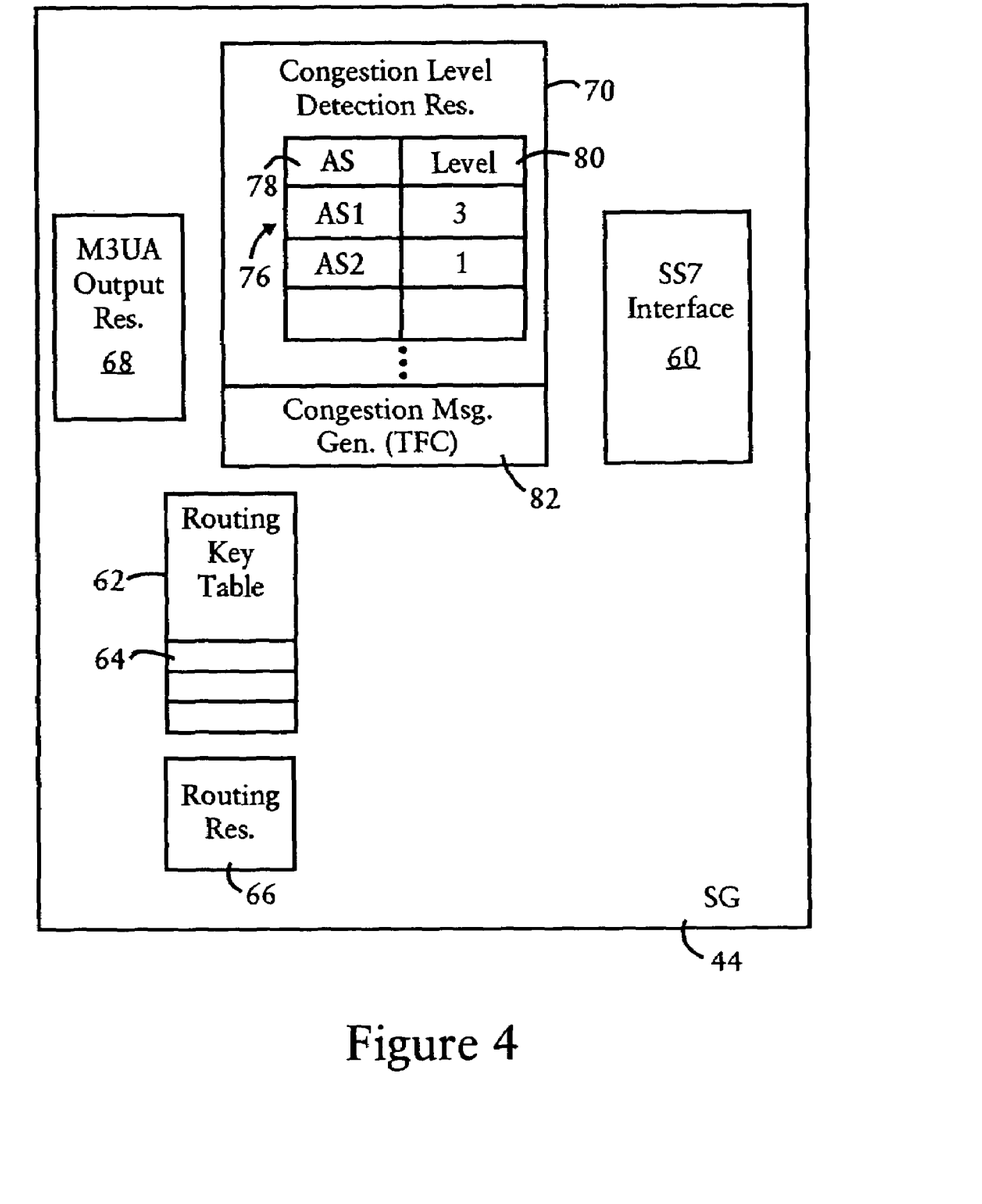
FIG. 4 is a diagram illustrating in detail the signaling gateway of FIG. 3.

FIG. 4 is a diagram illustrating in detail the signaling gateway 44 according to an embodiment of the present invention. The signaling gateway 44 includes a switched circuit network (SCN) interface 60 configured for sending and receiving signaling messages (e.g., SS7 messages) to and from the signaling network 22. As described above with respect to FIG. 2, each signaling message includes an MTP layer 26 specifying an originating point code that identifies the SEP 13 having sent the signaling message 18, a destination point code matching the prescribed (i.e., provisioned)

point code assigned the signaling gateway 44, and a signaling application protocol message 24.

The signaling gateway 44 also includes a routing key table 62 having multiple routing keys 64, a routing resource 66, an IP based output resource 68, and a congestion level determination resource 70.

The routing key table 62 is configured for storing routing keys that specify routing key parameters (i.e., attributes), for matching a received signaling message to one of the application servers 48. Each of the routing keys 64 include a routing context, an originating point code key field, user part application-based routing key fields, and an application server identifier. The routing context typically is implemented as a four-byte value that uniquely identifies the corresponding routing key 64.

For example, the routing keys 64 for ISUP and TUP messages include OPC, DPC, Circuit Identification Code (CIC) value, and Service Indicator (SI) value. The routing keys 64 for SCCP messages include OPC, DPC, SI, and subsystem number (SSN) values. As described above, there is a 1-to-1 relationship between routing keys and application servers 48.

Hence, the routing resource 66, in response to receiving a signaling message 52 or 54, identifies from the received signaling message the OPC, and any relevant user part signaling parameters (e.g., SI, SSN) to identify the routing key 64 having matching key value entries. The destination AS (e.g., 48a) is identified by the routing resource 66 based on the corresponding matching routing key entry 64. Once the routing resource 66 has selected the candidate AS (e.g., 48a) based on matching the corresponding routing key with the relevant signaling information specified in the received signaling message, the congestion level determination resource 70 determines whether to block the received signaling message due to detected congestion conditions for the candidate AS.

Figure 5:
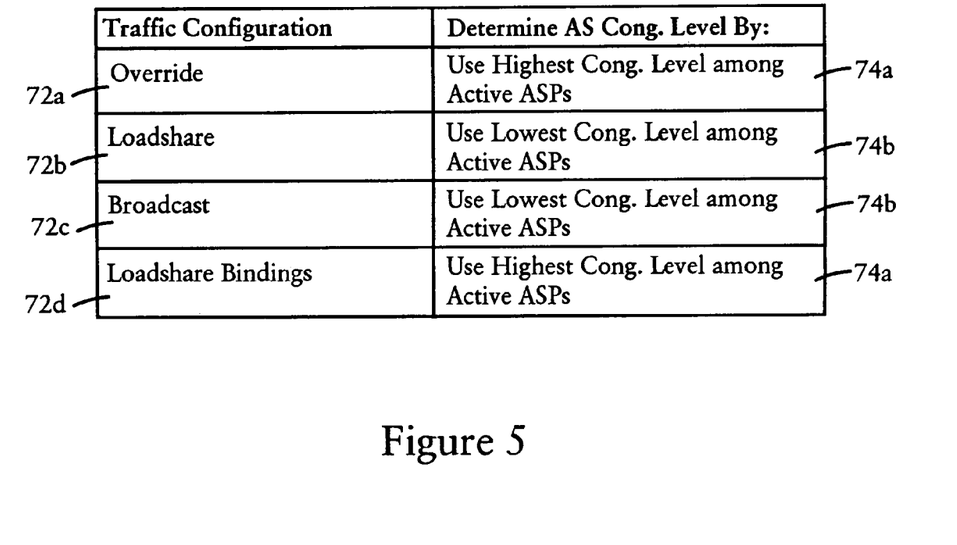
FIG. 5 is a diagram illustrating identification of an aggregated congestion level for an application server process group relative to a corresponding traffic configuration.

In particular, the congestion level determination resource 70 is configured for determining a congestion level for each of the ASP groups 48 based on received congestion messages (i.e., Notification of Congestion Change Message) for the active ASPs 46, and based on the traffic configuration for the corresponding ASP group 48. In particular, FIG. 5 is a diagram illustrating the steps used to calculate AS congestion level based on traffic configuration. As illustrated in FIG. 5, an override configuration 72a or a loadshare binding configuration 72d for a given AS 48 causes the congestion level detection resource 70 to calculate congestion level by using the highest congestion level detected among the active ASPs 46 (step 74a). In contrast, a loadshare configuration 72b or a broadcast configuration 72c for a given AS 48 causes the congestion level detection resource 70 to calculate congestion level by using the lowest congestion level detected among the active ASPs 46 (step 74b).

The override configuration 72a refers to the traffic configuration where only one ASP (e.g., 46a) of the ASP group (e.g., 48a) is active at a time, and the remaining ASPs (e.g., 46b and 46c) within the same AS (e.g., 48a) remaining inactive until the active ASP transitions to an inactive state, at which point one of the other ASPs of the group proactively becomes active in its place. The loadshare configuration 72b refers to the traffic configuration where every signaling message received sequentially through the selected AS (e.g., 48a) would be shared across the active ASPs (e.g., 46a, 46b, 46c). The broadcast configuration 72c refers to the traffic configuration where any received message destined for the AS (e.g., 48a) is sent to all active ASPs of the group.

The loadshare bindings configuration 72d refers to a variation of the loadshare configuration 72b, where a particular parameter within the signaling message is noted when the signaling messages output to a given ASP; for example, assuming an ISUP message 50 is to be output to the ASP 46d, the signaling gateway 44 performs a binding association between the destination ASP 46d and a particular parameter value within the received signaling message 50d, for example the Circuit Identification Code (CIC) value within the ISUP message. Hence, all messages associated with a given flow are sent to the same ASP, enabling different subsystems of message classes to be sent to respective ASPs based on the bindings.

If the congestion level detection resource 70 determines that the priority of a received message exceeds the specified congestion level for an AS 48, the congestion level detection resource 70 allows the signaling message to be output to one of the ASPs 46 of the destination AS 48 according to the traffic configuration. The IP based output resource, implemented according to M3UA and SUA protocols, is configured for sending IP-based signaling messages to the destination ASP 46.

The congestion level detection resource 70 includes an AS congestion table 76 configured for tracking the congestion level 80 for each AS 48 based on a corresponding identifier 78. If the congestion level detection resource 70 determines that the priority of the received signaling message 52 or 54 does not exceed the specified congestion level 80, the congestion message generator 82 within the congestion level determination resource 70 outputs a congestion message (e.g., a TFC message) to the originating signaling node 13. Note that the TFC messages typically are rate controlled to prevent flooding of TFC messages due to, for example, MSUs having already been sent; hence, typically a TFC need not be sent if another TFC has already been sent within the rate control time interval.

Figure 6:
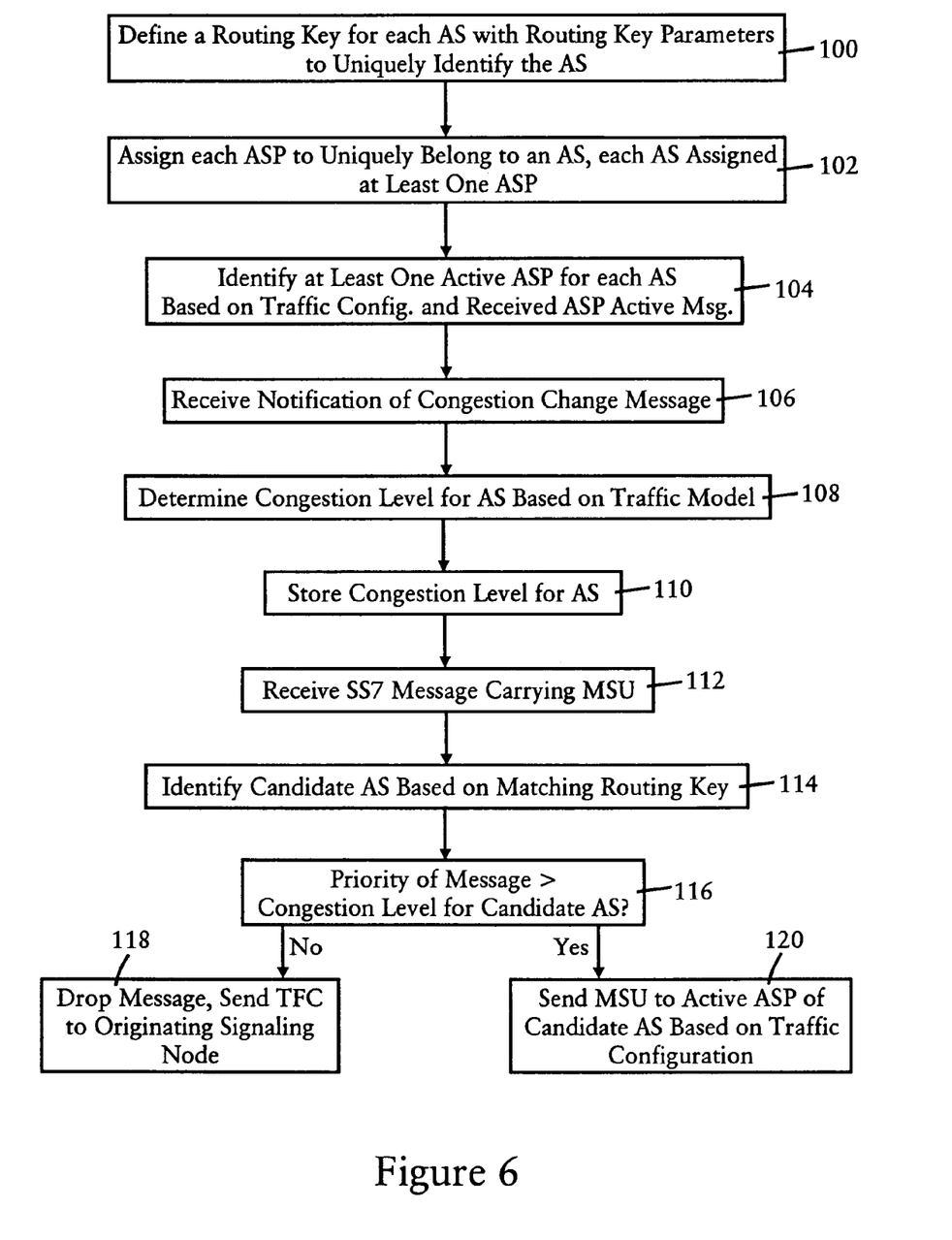
FIG. 6 is a diagram illustrating the method of controlling congestion for an application server process group, according to an embodiment of the present invention.

FIG. 6 is a diagram illustrating the method of controlling congestion for multiple ASP groups sharing a single signaling point code using respective group congestion levels, according to an embodiment of the present invention. The steps described herein with respect to FIG. 6 can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where a network administrator will define and store within the routing key table 62 a routing key, for each ASP group (i.e., AS) 48, with routing key parameters to uniquely identify the corresponding AS (e.g., 48a). As illustrated in FIG. 3, the routing key parameters may be selected such that the first ASP group (AS1) 48a is configured for processing SCCP messages, and the second ASP group (AS2) 48b is configured for processing ISUP messages. The network administrator also assigns in step 102 each ASP 46 to uniquely belong to an AS (e.g., AS1 48a), such that each AS is assigned at least one ASP 46. Actual identification of an ASP 46 by the signaling gateway 44 is based on the remote IP address(es) of the corresponding ASP 46, and the local SCTP port used by the SG 44.

The signaling gateway 44 identifies in step 104 at least one active ASP 46 for each AS 48 based on the corresponding traffic configuration and the active status messages received from the ASPs within the corresponding group. At this point the signaling gateway 44 is ready to route signaling messages to the ASP groups 48 according to the routing keys specified in the routing key table 62.

Assume in step 106 that the IP interface 68 of the signaling gateway 44 receives a Notification of Congestion Change message for one of the ASPs 46. As described above with respect to FIG. 5, the congestion level detection resource 70 determines in step 108 the congestion level for the corresponding ASP group (i.e., AS) 48 based on the traffic configuration (e.g., 72a, 72b, 72c, or 72d). The congestion level determination resource 70 stores in step 110 the determined congestion level for the corresponding ASP 48 in the congestion table 76, specifying the AS identifier 78 and the congestion level 80.

Assume in step 112 that the signaling interface 60 of the signaling gateway 44 receives an SS7 message 52 carrying an MSU 50. The routing resource 66 identifies in step 114 a candidate AS 48 based on identifying a matching routing key relative to selected parameters specified in the received signaling message.

If in step 116 the congestion level detection resource 70 determines that the priority specified in the received signaling message is less than the specified congestion level 80 for the candidate AS 48, the congestion level detection resource 70 drops in step 118 the received signaling message, and causes the congestion message generator 82 to output a transfer controlled (TFC) message 56 to the originating signaling node 13. However if in step 116 the congestion level detection resource 70 determines that the priority specified in the received signaling message exceeds the specified congestion level 80 for the candidate AS 48, the congestion level detection resource 70 causes in step 120 the IP output resource 68 to send the MSU to the active ASP 46 of the candidate AS 48 according to the selected traffic configuration 72.

According to the disclosed embodiment, congestion management is more precisely controlled in a voice over IP network. Hence, the transmission of unnecessary TFC messages by the voice over IP network is minimized.

Note that variations may be implemented within the disclosed embodiment. For example, an AS may have its own point code different from the ITP's primary, capability, and secondary point codes.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network, the method including:
    determining by a signaling gateway a congestion level for each of a plurality of Voice over IP-based application server process groups, each of the application server process groups distinct from the signaling gateway and sharing a same prescribed point code with the signaling gateway, each application server process group having at least one assigned application server process sharing the prescribed point code and configured for providing services for a corresponding message signaling unit attribute, each application server process assigned to one of the application server process groups;
    receiving by the signaling gateway an SS7 message having an originating point code specifying an originating node and a destination point code specifying the prescribed point code, the SS7 message carrying a message signaling unit having specified attributes;
    identifying by the signaling gateway one of the application server process groups as a candidate group for processing the message signaling unit based on a determined match between the corresponding message signaling unit attribute and at least a corresponding portion of the specified attributes; and
    selectively sending by the signaling gateway to the originating node a congestion notification message based on determining that an identified priority of the message signaling unit does not exceed the corresponding congestion level for the candidate group.

2. The method of claim 1, wherein the determining step includes determining the congestion levels for each application server process group based on a corresponding traffic configuration.

3. The method of claim 2, wherein the traffic configuration for a corresponding application server process group includes one of an override configuration, a loadshare configuration, a broadcast configuration, or a loadshare bindings configuration.

4. The method of claim 3, wherein the determining includes:
    selectively setting the congestion level for a corresponding application server process group based on a highest determined congestion of an associated one of the application server processes, based on the corresponding application server process group having the override configuration;
    selectively setting the congestion level for a corresponding application server process group based on a lowest determined congestion of an associated one of the application server processes, based on the corresponding application server process group having the loadshare configuration;
    selectively setting the congestion level for a corresponding application server process group based on a lowest determined congestion of an associated one of the application server processes, based on the corresponding application server process group having the broadcast configuration; and
    selectively setting the congestion level for a corresponding application server process group based on a highest determined congestion of an associated one of the application server processes, based on the corresponding application server process group having the loadshare bindings configuration;
    each application server process assigned to only one of the application server process groups.

5. The method of claim 1, wherein a first and second of the application server process groups are configured for providing Signaling Connection Control Part (SCCP) message service and ISDN User Part message service as the respective message signaling unit attributes.

6. The method of claim 1, further comprising:
    receiving a second SS7 message having a second originating point code specifying a second originating node and the destination point code specifying the prescribed point code, and carrying a second message signaling unit having second specified attributes;
    identifying another one of the application server process groups as a second candidate group based on determined match between the corresponding message signaling unit attribute and at least a corresponding portion of the second specified attributes, distinct from the portion of the specified attributes of the message signaling unit;
    sending the second message signaling unit to an identified active one of the application server processes of the another one of the application server process groups, based on a determined priority of the second message signaling unit exceeding the congestion level of the second candidate group and independent of the congestion level of the candidate group.

7. The method of claim 1, further comprising selectively outputting to an identified one of the assigned application server processes of the candidate group the message signaling unit based on determining that the identified priority of the message signaling unit exceeds the corresponding congestion level for the candidate group.

8. The method of claim 7, wherein the selectively outputting includes identifying the identified one assigned application server process based on receiving an application server process active message from the identified one assigned application server process.

9. A signaling gateway in a network, the signaling gateway comprising:
means for determining a congestion level for each of a plurality of Voice over IP-based application server process groups, each application server process group distinct from the signaling gateway and sharing a same prescribed point code with the signaling gateway, each application server process group having at least one assigned application server process sharing the prescribed point code and configured for providing services for a corresponding message signaling unit attribute, each application server process assigned to one of the application server process groups;
means for receiving an SS7 message having an originating point code specifying an originating node and a destination point code specifying the prescribed point code, the SS7 message carrying a message signaling unit having specified attributes;
means for identifying one of the application server process groups as a candidate group for processing the message signaling unit based on a determined match between the corresponding message signaling unit attribute and at least a corresponding portion of the specified attributes; and
the determining means configured for selectively sending to the originating node a congestion notification message based on determining that an identified priority of the message signaling unit does not exceed the corresponding congestion level for the candidate group.

10. The gateway of claim 9, wherein the determining means is configured for determining the congestion levels for each application server process group based on a corresponding traffic configuration.

11. The gateway of claim 10, wherein the traffic configuration for a corresponding application server process group includes one of an override configuration, a loadshare configuration, a broadcast configuration, or a loadshare bindings configuration.

12. The gateway of claim 11, wherein the determining means is configured for:
selectively setting the congestion level for a corresponding application server process group based on a highest determined congestion of an associated one of the application server processes, based on the corresponding application server process group having the override configuration;
selectively setting the congestion level for a corresponding application server process group based on a lowest determined congestion of an associated one of the application server processes, based on the corresponding application server process group having the loadshare configuration;
selectively setting the congestion level for a corresponding application server process group based on a lowest determined congestion of an associated one of the application server processes, based on the corresponding application server process group having the broadcast configuration; and
selectively setting the congestion level for a corresponding application server process group based on a highest determined congestion of an associated one of the application server processes, based on the corresponding application server process group having the loadshare bindings configuration;
each application server process assigned to only one of the application server process groups.

13. The gateway of claim 9, wherein a first and second of the application server process groups are configured for providing Signaling Connection Control Part (SCCP) message service and ISDN User Part message service as the respective message signaling unit attributes.

14. The gateway of claim 9, wherein:
the receiving means is configured for receiving a second SS7 message having a second originating point code specifying a second originating node and the destination point code specifying the prescribed point code, and carrying a second message signaling unit having second specified attributes;
the identifying means configured for identifying another one of the application server process groups as a second candidate group based on determined match between the corresponding message signaling unit attribute and at least a corresponding portion of the second specified attributes, distinct from the portion of the specified attributes of the message signaling unit;
the determining means configured for sending the second message signaling unit to an identified active one of the application server processes of the another one of the application server process groups, based on a determined priority of the second message signaling unit exceeding the congestion level of the second candidate group and independent of the congestion level of the candidate group.

15. The gateway of claim 9, wherein the determining means is configured for outputting to an identified one of the assigned application server processes of the candidate group the message signaling unit based on determining that the identified priority of the message signaling unit exceeds the corresponding congestion level for the candidate group.

16. A signaling gateway in a network, the signaling gateway comprising:
a congestion level detection circuit configured for determining a congestion level for each of a plurality of Voice over IP-based application server process groups, each application server process group distinct from the signaling gateway and sharing a same prescribed point code with the signaling gateway, each application server process group having at least one assigned application server process sharing the prescribed point code and configured for providing services for a corresponding message signaling unit attribute, each application server process assigned to one of the application server process groups;
a switched circuit network interface configured for receiving an SS7 message having an originating point code specifying an originating node and a destination point code specifying the prescribed point code, the SS7 message carrying a message signaling unit having specified attributes; and
a routing circuit configured for identifying one of the application server process groups as a candidate group for processing the message signaling unit based on a determined match between the corresponding message signaling unit attribute and at least a corresponding portion of the specified attributes;

the congestion level detection circuit configured for selectively sending to the originating node a congestion notification message based on determining that an identified priority of the message signaling unit does not exceed the corresponding congestion level for the candidate group.

17. The gateway of claim 16, wherein the congestion level detection circuit is configured for determining the congestion levels for each application server process group based on a corresponding traffic configuration.

18. The gateway of claim 17, wherein the traffic configuration for a corresponding application server process group includes one of an override configuration, a loadshare configuration, a broadcast configuration, or a loadshare bindings configuration.

19. The gateway of claim 18, wherein the congestion level detection circuit is configured for:

selectively setting the congestion level for a corresponding application server process group based on a highest determined congestion of an associated one of the application server processes, based on the corresponding application server process group having the override configuration;

selectively setting the congestion level for a corresponding application server process group based on a lowest determined congestion of an associated one of the application server processes, based on the corresponding application server process group having the loadshare configuration;

selectively setting the congestion level for a corresponding application server process group based on a lowest determined congestion of an associated one of the application server processes, based on the corresponding application server process group having the broadcast configuration; and selectively setting the congestion level for a corresponding application server process group based on a highest determined congestion of an associated one of the application server processes, based on the corresponding application server process group having the loadshare bindings configuration;

each application server process assigned to only one of the application server process groups.

20. The gateway of claim 16, wherein a first and second of the application server process groups are configured for providing Signaling Connection Control Part (SCCP) message service and ISDN User Part message service as the respective message signaling unit attributes.

21. The gateway of claim 16, wherein:

the switched circuit network interface is configured for receiving a second SS7 message having a second originating point code specifying a second originating node and the destination point code specifying the prescribed point code, and carrying a second message signaling unit having second specified attributes;

the routing circuit configured for identifying another one of the application server process groups as a second candidate group based on determined match between the corresponding message signaling unit attribute and at least a corresponding portion of the second specified attributes, distinct from the portion of the specified attributes of the message signaling unit;

the congestion level detection circuit configured for causing the second message signaling unit to be sent to an identified active one of the application server processes of the another one of the application server process groups, based on a determined priority of the second message signaling unit exceeding the congestion level of the second candidate group and independent of the congestion level of the candidate group.

22. The gateway of claim 21, further comprising an Internet Protocol (IP) based output circuit configured for outputting the second message signaling unit to the identified active one of the application server processes.

23. The gateway of claim 16, wherein the congestion level detection circuit is configured for causing the message signaling unit to be output to an identified one of the assigned application server processes of the candidate group based on determining that the identified priority of the message signaling unit exceeds the corresponding congestion level for the candidate group.

24. The gateway of claim 23, wherein the congestion level detection circuit is configured for identifying the identified one assigned application server process based on receiving an application server process active message from the identified one assigned application server process.

* * * * *